United States Patent
Westbury et al.

[15] 3,667,344
[45] June 6, 1972

[54] POSITION CONTROL SERVO SYSTEMS
[72] Inventors: Roy Westbury, Bridgnorth; John Richard Simmons, Wolverhampton, both of England
[73] Assignee: H. M. Hobson Limited, London, England
[22] Filed: Nov. 24, 1970
[21] Appl. No.: 92,343

[30] Foreign Application Priority Data
Nov. 25, 1969 Great Britain..................7,677/69

[52] U.S. Cl..............................................91/1, 91/3, 91/365
[51] Int. Cl...................................F15b 13/02, F01b 25/26
[58] Field of Search.............................91/1, 3, 365, 363 A

[56] References Cited

UNITED STATES PATENTS

| | | | |
|---|---|---|---|
| 3,464,318 | 9/1969 | Thayer et al. | 91/365 |
| 3,411,410 | 11/1968 | Westbury et al. | 91/1 |
| 3,555,970 | 1/1971 | Borgeson | 91/365 |
| 3,461,778 | 8/1969 | Westbury et al. | 91/3 |
| 2,947,286 | 8/1960 | Baltus et al. | 91/365 |
| 3,198,083 | 8/1965 | Farr et al. | 91/1 |

Primary Examiner—Martin P. Schwadron
Assistant Examiner—Clemens Schimlkowski
Attorney—Martin Kirkpatrick

[57] ABSTRACT

A position control servo system comprising a hydraulic actuator controlled by a fluid control valve which is responsive to output signals applied to it from a pair of transducers, each of which is responsive to an input signal applied thereto to produce an actuator output which a function of the input signals, which are in normal operation substantially equal, and control means responsive to a difference between the transducer output signals up to a predetermined and allowable difference to adjust on or the other or both of the transducers and/or input signals thereto, thereby to maintain the tranducer output signals within the predetermined and allowable difference and to produce an indication when the difference is exceeded.

6 Claims, 1 Drawing Figure

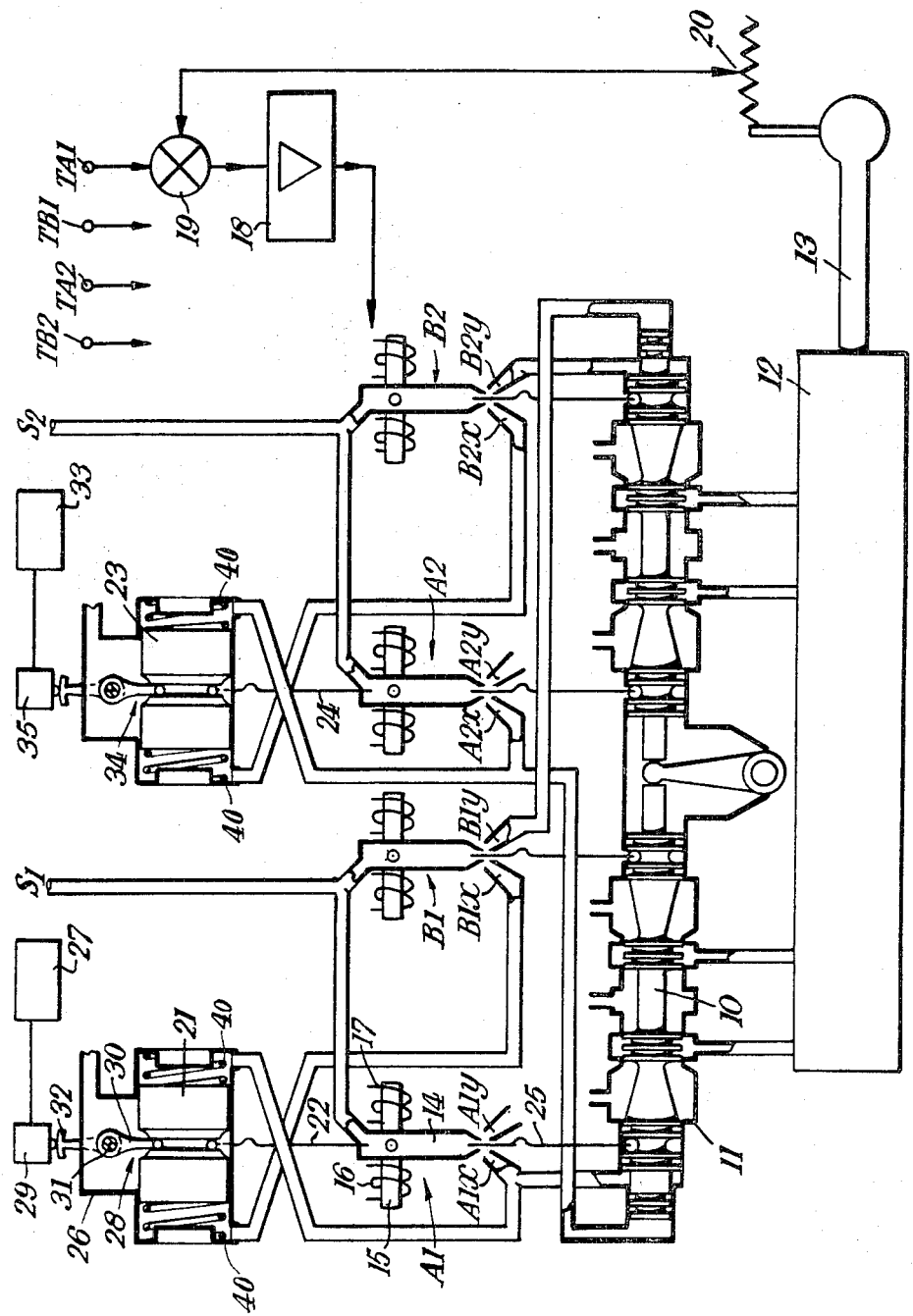

POSITION CONTROL SERVO SYSTEMS

This invention relates to position control servo systems and particularly though not exclusively to a position control servo system for an aircraft control surface.

According to the present invention, there is provided a position control servo system comprising an hydraulic actuator controlled by a fluid control valve which is responsive to output signals applied to it from a pair of transducers, each of which is responsive to an input signal applied thereto to produce an actuator output which is a function of the input signals, which are in normal operation substantially equal, and control means responsive to a difference between the transducer output signals up to a predetermined and allowable difference to adjust one or the other or both of the said transducers and/or input signals thereto, thereby to maintain the transducer output signals within said predetermined and allowable difference and to produce an indication when the allowable difference is exceeded.

The servo system according to the invention provides a means for assessing the relative magnitudes of a pair of signals by the introduction of a subsidiary control piston which is displaced from its neutral position by an amount related to the difference between the magnitudes of the two signals. It reduces dead zone conditions at the output of the system by absorbing signal differences and also provides a reliable means whereby the signal difference can be detected and if it exceeds a predetermined amount automatically provide a means for fault indication.

An embodiment of the invention will now be described by way of example with reference to the accompanying drawing which is a block schematic diagram of a position control servo system according to the invention.

In the system shown in the drawing, two pairs of transducers in the form of hydraulic servo valves A1, B1 and A2, B2 are arranged to control the movement of a two-part spool 10 of a fluid control valve 11, which controls the supply of pressure fluid to a ram 12, the plunger 13 of which forms the output element of the system.

The hydraulic servo valve A1 consists of an angularly displaceable nozzle 14 which receives fluid under pressure from a source S1 and directs it as a jet more into the one than the other of two receptor ducts A1x and A1y according to the angular disposition taken up by the nozzle. The nozzle 14 carries an armature 15 with which are associated electromagnetic coils 16 and 17 and the arrangement is such that the nozzle 14 is angularly displaced by the electromagnetic torque generated by energization of the coils. The coils 16 and 17 are fed with input signals from an amplifier 18 which is fed with an error signal from a comparator 19 which receives an input demand signal from an input terminal TA1 and a negative feedback signal from a transducer 20 representative of the output displacement of the output element 13.

Each of the other servo valves B1, A2 and B2 are of the same construction as the servo valve A1, the electrical input signals to these valves being derived in the same manner as the input signal to the valve A1, from input demand signals applied to terminals TB1, TA2 and TB2. The nozzle of the servo valve B1 is fed with pressure fluid from the source S1 and the nozzles of the valves A2 and B2 are fed from a common pressure-fluid source S2.

The receptor ducts A1x and A2x are, as shown, connected to apply pressure fluid to one end of the two-part spool 10 of the valve 11 and the receptor ducts B1y and B2y are connected to apply pressure fluid to the other end of the spool 10. The receptor ducts A1y and A2y are connected back to the tanks of the pressure fluid sources S1 and S2. For the purpose of giving one of the pairs of servo valves a force authority over the other pair, the areas over which the pressure fluid is applied to the two ends of the spool 10 from the servo valves A1 and B1 are arranged to be smaller than those receiving pressure fluid from the servo valves A2 and B2. The arrangement is nevertheless such that the forces applied to the spool are balanced and produce no movement of the spool from its central position in the absence of input demand signals at the input terminals TA1, TB1, TA2 and TB2.

The receptor ducts A1x and B1x are connected to apply the pressure fluid therein to the opposite ends of a subsidiary piston 21, the displacement of which is transmitted as an adjusting torque to the nozzle 14 by a feedback mechanical spring connection 22, and the arrangement is such that any discrepancy between the pressure fluid outputs from the receptor ducts A1x and B1x produces a displacement of the piston 21 giving rise to the application of an adjusting torque on the nozzle 14 which will correct the discrepancy between the two pressure fluid outputs. Thus if the pressure in A1X exceeds that in B1X the piston 21 will move to the left and the spring 22 will rock the nozzle 14 anticlockwise to reduce the pressure in A1X. The servo valves A2 and B2 are associated in like manner with a subsidiary piston 23 and a feedback mechanical spring connection 24 provides an adjusting torque on the nozzle of the valve A2 to correct any discrepancy between the pressure fluid outputs from the ducts A2x and B2x.

A mechanical spring connection 25 is provided between the spool 10 and the nozzle 14 of the valve A1 to apply to the nozzle 14 a negative feedback torque representative of the displacement of the spool 10 and each of the other servo valves B1, A2 and B2 is likewise provided with a similar feedback connection.

The displacement of the spool 10 and of the subsidiary pistons 21 and 23 are thus mechanically computed, converted to bending moments and compared with the electromagnetic torques applied to the nozzles in response to the input demand signals.

Under normal operation, when hydraulic supply pressure fluid is applied to one of the pairs of servo valves, the mechanical feedback connections ensure that a state of equilibrium is produced with pressure balance both at the output control valve 11 and at the associated subsidiary piston 21 or 23. Any discrepancy between the outputs from the two servo valves will be a function of the applied input supply voltages and the displacement of the subsidiary piston from its mid-position will be a function of the total disparity between the two signal channels, the latter function being related to the pressure-gain characteristics of the two servo valves. When pressure fluid is supplied to both pairs of servo valves, the complete assembly under normal operating conditions behaves in a manner similar to that described for one pair of servo valves.

It is possible for one of the pairs of servo valves to develop a null shift in opposition to that being developed in the other pair of servo valves. This would give rise to a dead zone condition in a completely symmetrical arrangement. The present arrangement is, however, such that the pair of servo valves A2 and B2 exhibits a force authority on the output spool 10 over the other pair and the possibility of such a dead zone condition arising is avoided without introducing undesirable side effects.

Two centralizing springs 40 are provided for each of the subsidiary pistons 21 and 23. These springs serve to move the subsidiary pistons to their central positions for start-up purposes only. They are therefore very lightly loaded and have virtually no influence on the normal operation of the system.

The travel of the subsidiary piston 21 is limited in each direction by the provision of an exhaust chamber 26 which opens into the cylinder containing the piston 21 and is connected by a return duct to the tank of the pressure fluid source S1. When the piston 21 is displaced from its neutral position through a predetermined distance representing a predetermined and allowable difference between the fluid pressure outputs of the servo valves A1 and B1, the pressure fluid outputs of increased magnitude which gives rise to the displacement of the piston is vented to the exhaust chamber 26 and returned to the tank of the pressure fluid source S1, thereby preventing further displacement of the piston.

The subsidiary piston 21 serves to control the operation of an indicator 27 through a mechanical linkage 28 operating a microswitch 29. The mechanical linkage 28 comprises a lever 30, the lower end of which engages in a slot formed in the piston 21 and the upper end of which is fixedly mounted on a horizontally disposed rotatable rod 31 which passes through and is supported by the chamber 26. The rod 31, at a position outside the chamber 26, has fixedly mounted thereon the lower end of a further lever 32, against the upper end face of which the microswitch 29 is caused to bear. In operation, upon displacement of the piston 21 to the right, as shown in the figure, the lever 30 is caused to pivot counterclockwise and turn the rod 31 counterclockwise. The turning of the rod 31 causes the lever 32 to pivot counterclockwise through a predetermined angle and the arrangement is made such that the microswitch 29 is released from the end face of the lever 32 to operate the indicator 27 when the limit of travel of the piston 21 to the right is reached. Movement of the piston 21 to the left results in a clockwise pivoting of the lever 32 and the release of the microswitch 29 from the end face of the lever 32 when the limit of the travel of the piston to the left is reached.

The subsidiary piston 23 is likewise arranged to operate an indicator 33 through a mechanical linkage 34 and a further microswitch 35.

It will be appreciated that the indicators 27 and 33 may provide a visual or audible alarm signal.

The principle whereby the relative movement of the output spool and a subsidiary piston is used to provide (a) an output displacement which is a function of an applied input signal and (b) a means for comparing the output displacement with the input signal and correcting any discrepancy between them is similar to that described in U.S. Pat. No. 3,411,410. The advantage of the system according to the present invention is that it can be applied to any multiple of duplex actuators without using the springboxes and the trilever described in that specification.

What we claim as our invention and desire to secure by Letters Patent is:

1. A position control servo system comprising a hydraulic actuator, a control valve controlling said actuator, a pair of hydraulic servo valves which control hydraulic pressures applied across the control valve, means for applying nominally equal input signals to the two servo valves, said servo valves responding to said input signals to apply a hydraulic pressure difference across the control valve, and thereby effect movement of the control valve to actuate said actuator, and also to develop pressure signals which are functions of said input signals, means for comparing said output pressure signals, means controlled by said comparing means for adjusting one of said servo valves, in response to a difference between said output pressure signals, in the sense to reduce said difference, and an indicator controlled by said comparing means and operable thereby when said difference attains a predetermined value.

2. A system as claimed in claim 1, wherein the comparing means is a piston subject at its opposite ends to said output hydraulic pressure signals, said piston being connected by a spring to said one hydraulic servo valve.

3. A system as claimed in claim 2, wherein said piston is movable to vent the greater of the output hydraulic pressure signals acting upon it when the difference between the output hydraulic pressure signals attains said predetermined value.

4. A system as claimed in claim 2, which includes a switch operable by said piston to actuate the indicator upon predetermined movement of the piston in either direction from a central position.

5. A system as claimed in claim 1, wherein each hydraulic servo valve comprises an electromagnetically controlled nozzle movable to direct pressure fluid to receptor ducts providing for flow of the fluid from said nozzles to the comparing means and to the control valve.

6. A system as claimed in claim 1, which includes a further pair of hydraulic servo valves which control the hydraulic pressure difference applied to larger areas of the control valve than the areas subject to the hydraulic pressure difference from said first-mentioned hydraulic servo valves, further input signal means for applying nominally equal input signals to said further servo valves, said further servo valves responding to said input signals to apply a hydraulic differential to said larger areas of the control valve and to develop hydraulic output signals which are functions of said input signals, further comparing means for comparing said output pressure signals from said further servo valves, means controlled by said further comparing means for adjusting one of said further servo valves, response to a difference between the output pressure signals from the further servo valves, in the sense to reduce said difference, and a further indicator controlled by the further comparing means and operable thereby when said difference attains a predetermined value.

* * * * *